United States Patent [19]

Lohrentz et al.

[11] Patent Number: 5,511,498
[45] Date of Patent: Apr. 30, 1996

[54] ECCENTRIC CAM LOCKING ASSEMBLY

[76] Inventors: Randy M. Lohrentz, Rt. 1, 13412 E. 56th; Loren Dick, Rt. 1, 14316 E. 56th, both of, Buhler, Kans. 67522

[21] Appl. No.: 358,853

[22] Filed: Dec. 19, 1994

[51] Int. Cl.⁶ ..................................................... A01C 5/06
[52] U.S. Cl. ............................... 111/191; 74/567; 74/570; 111/193
[58] Field of Search .................................. 172/538, 192, 172/193, 195, 196, 194; 111/190–196; 403/315; 74/567, 570

[56] References Cited

U.S. PATENT DOCUMENTS

| | | | |
|---|---|---|---|
| 544,511 | 8/1895 | Mansfield | 77/571 R |
| 618,173 | 1/1899 | Hassis | 74/571 |
| 2,511,978 | 6/1950 | Georgeff | 74/570 |
| 2,567,555 | 9/1951 | Davis | 74/570 |
| 2,733,082 | 1/1956 | Backhouse | 74/570 |
| 2,838,017 | 6/1958 | Waldron, Jr. | 111/63 |
| 3,577,801 | 5/1971 | Netta | 74/571 R |
| 4,273,057 | 6/1981 | Pollard | 111/195 |
| 4,307,674 | 12/1981 | Jennings et al. | 111/85 |
| 4,398,478 | 8/1983 | Frase et al. | 111/85 |
| 4,404,918 | 9/1983 | Whalen et al. | 111/85 |
| 4,528,920 | 7/1985 | Neumeyer | 111/85 |
| 4,570,554 | 2/1986 | Clark | 111/85 |
| 4,831,945 | 5/1989 | Neumeyer | 111/73 |
| 4,844,174 | 7/1989 | Zimmerman | 172/538 |
| 4,920,901 | 5/1990 | Pounds | 111/164 |
| 5,022,333 | 6/1991 | McClure et al. | 111/194 |

OTHER PUBLICATIONS

John Deere Brochure.

*Primary Examiner*—Spencer K. Warnick, IV
*Attorney, Agent, or Firm*—John R. Flanagan

[57] ABSTRACT

An eccentric cam locking assembly includes an elongated locking bar having a first end portion and an opposite second end portion, a first fastening arrangement defined on the first end portion of the bar for mounting the bar on a stationary member of a seed planting implement and a second fastening arrangement defined on the opposite second end portion of the bar for clamping the bar on an eccentric cam that is mounted to the implement so as to rotate relative thereto to align the position of furrow closing wheels mounted on a swing arm extending from the rear of the seed planting implement. When installed, the locking assembly inhibits misalignment of the furrow closing wheels by providing additional resistance against unintended rotation of the eccentric cam. The second fastening arrangement is releasable so that the eccentric cam may be turned when the furrow closing wheels need to be aligned. The locking assembly also includes a sleeve which fits over the eccentric cam to prevent the locking bar from contacting the swing arm. The locking assembly further includes a hexagonal nut attached to the outer end of the eccentric cam for facilitating engagement of a tool with the eccentric cam to assist in turning the eccentric cam when aligning the furrow closing wheels.

20 Claims, 1 Drawing Sheet

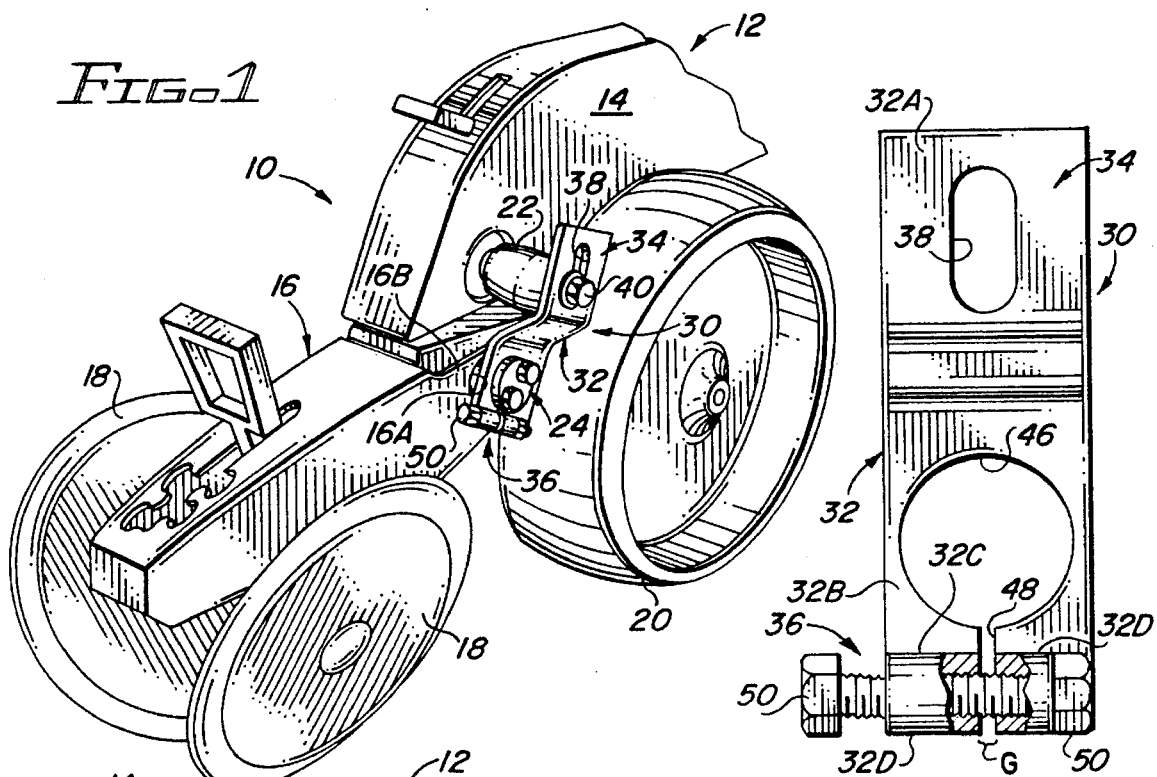
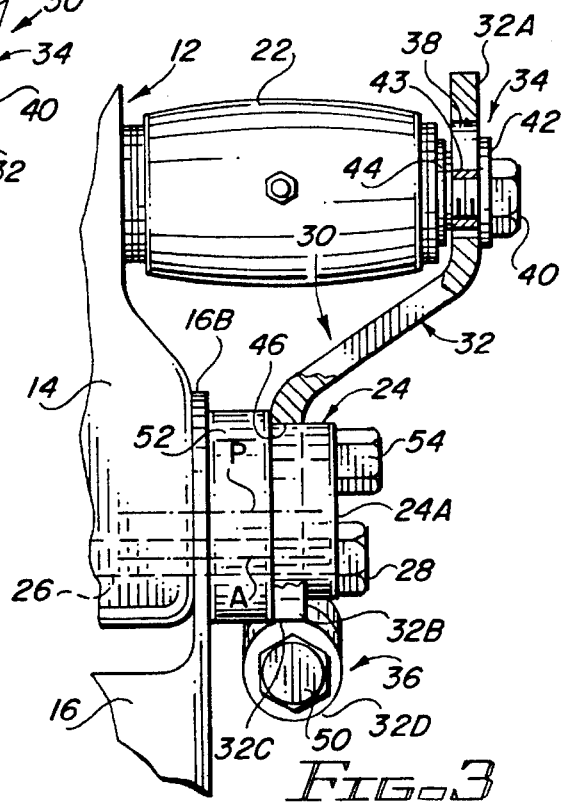

ECCENTRIC CAM LOCKING ASSEMBLY

BACKGROUND OF THE INVENTION

1. Field of the Invention

The present invention generally relates to seed planting implements and, more particularly, is concerned with an eccentric cam locking assembly for mounting on seed planting implements.

2. Description of the Prior Art

Many seed planting implements include a plurality of seed planting units each including means for opening a furrow in the ground, means for depositing seed in the furrow and means for closing the furrow as the seed planting implement is pulled across a field. Each means for closing the furrow typically includes a pair of furrow closing wheels, sometimes called press wheels, mounted on an arm which extends from the rear of the implement so that the closing wheels trail the implement and close the furrow after the seed is deposited in the furrow. The furrow must be properly closed to adequately cover the seed with soil and achieve the contact with the soil necessary for optimal seed germination. To properly close the seed furrow, the furrow closing wheels must be correctly aligned with the seed furrow.

Various means have been developed to properly align the furrow closing wheels with the seed furrow. In some seed planting implements, an arm on which the furrow closing wheels are mounted may be adjusted sidewise by rotation of an eccentric cam. To adjust the arm, a retaining bolt mounting the eccentric cam is loosened and the eccentric cam is turned clockwise to swing the arm and thereby move the closing wheels to the right or turned counterclockwise to swing the arm and thereby move the closing wheels to the left. When the closing wheels are properly aligned with the seed furrow, the retaining bolt is tightened to prevent further inadvertent rotation of the eccentric cam. While the eccentric cam provides a very sensitive and effective means for achieving proper alignment of the furrow closing wheels, these type of seed planting implements also have a major drawback: unintended rotation of the eccentric cam occurs causing the furrow closing wheels to move out of alignment.

As the furrow closing wheels travel through the soil, forces are applied to the wheels. These forces are transmitted from the wheels through the arm resulting in a torque on the eccentric cam. Because the wheels are mounted at the end of the arm, a small force against the wheels is magnified by the length of the arm into a large torque on the eccentric cam. The retaining bolt has proven inadequate to resist this large torque, thereby allowing unintended rotation of the eccentric cam to occur resulting in misalignment of the furrow closing wheels. Because of this unintended rotation, frequent stops are necessary to realign the furrow closing wheels while using the seed planting implement. These frequent stops reduce the efficiency of the planting process.

Consequently, a need still exists for an assembly which may be mounted on existing seed planting implements having furrow closing wheels aligned by rotation of an eccentric cam that will inhibit or prevent unintended rotation of the eccentric cam.

SUMMARY OF THE INVENTION

The present invention provides an eccentric cam locking assembly designed to satisfy the aforementioned need by avoiding the drawbacks of the prior art without introducing other drawbacks. While the assembly of the present invention may be employed elsewhere, it is primarily intended for use with seed planting implements having an eccentric cam which is used to adjust the alignment of its furrow closing wheels. The eccentric cam locking assembly basically includes an elongated locking bar that acts on the eccentric cam to assist the retaining bolt in resisting torque which causes unintended rotation of the cam.

One feature of the eccentric cam locking assembly of the present invention is the ease with which it mounts on existing seed planting implements. One end of the locking bar is mounted on a stationary member of the seed planting implement and the opposite end of the locking bar is mounted on the eccentric cam. Since one end of the locking bar is mounted to a stationary member, the other end of the bar applies a force to the eccentric cam which resists both clockwise and counterclockwise rotation of the cam.

Another feature of the eccentric cam locking assembly is that it may be released. Opposite end portions of the locking bar define respective fastening arrangements which fasten the locking bar on the stationary member and eccentric cam and are releasable to allow rotation of the eccentric cam when the furrow closing wheels must be realigned, such as when the furrow closing wheels are changed for planting a different type of seed. These releasable fastening arrangements compensate for the resultant change in distance and angle between the eccentric cam and a fixed point on the stationary member to which the locking bar is fastened, caused by rotation of the eccentric cam when aligning the furrow closing wheels.

A further feature of the present invention is an element such as an hexagonal nut on the eccentric cam for engagement with a tool to assist in the rotation of the eccentric cam when adjusting the alignment of the furrow closing wheels. The hexagonal shaped nut is attached to the outer end of the eccentric cam and makes it easier to use a tool to turn the eccentric cam without completely removing the assembly.

A still another feature of the eccentric cam locking assembly is that it may be adapted to mount between the eccentric cam and various suitable stationary members of the seed planting implement. For example, the ends of the locking bar may be offset from one another in a direction transverse to the longitudinal direction of the bar so that the locking bar can be mounted between the eccentric cam and a stationary member such as a gauge wheel pivot that extends out farther from the side of the seed planting implement than the eccentric cam.

These and other features and advantages of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the following detailed description, reference will be made to the attached drawings in which:

FIG. 1 is a fragmentary perspective view of a rear portion of a seed planting implement having furrow closing wheels mounted on a swing arm which are aligned by rotation of an eccentric cam and a perspective view of an eccentric cam locking assembly of the present invention mounted on a gauge wheel pivot and the eccentric cam of the seed planting implement.

FIG. 2 is an enlarged perspective view of the eccentric cam locking assembly mounted on the gauge wheel pivot and eccentric cam of the seed planting implement.

FIG. 3 is a side view of the eccentric cam locking assembly mounted on the gauge wheel pivot and eccentric cam of the seed planting implement.

FIG. 4 is a front elevational view of the locking bar of the eccentric cam locking assembly.

DETAILED DESCRIPTION OF THE INVENTION

Referring to the drawings and particularly to FIG. 1, there is illustrated in fragmentary form a rear portion of a seed planting implement, generally designated 10. The seed planting implement 10 includes a plurality of seed planting units 12, only one of which is shown in fragmentary form in FIG. 1.

With respect to the portion thereof illustrated in FIG. 1, each seed planting unit 12 includes a stationary frame member 14, an elongated swing arm 16 extending rearwardly from the stationary frame member 14 and pivotally mounted thereto so as to undergo vertical movement relative to the stationary frame member 14, and a pair of furrow closing wheels 18 mounted on the rear end of the swing arm 16. The seed planting unit 12 also includes a gauge wheel 20 at each side, being mounted to and disposed below the stationary frame member 14 for supporting the rear portion of the seed planting unit 12 upon the ground, and a gauge wheel pivot 22 extending from one side of the stationary frame member 14.

The seed planting unit 12 further includes an eccentric cam 24 whose outer end portion 24A extends through an opening 16A in a hanger 16B on the swing arm 16. The eccentric cam 24 is rotatably mounted to the stationary frame member 14 so as to undergo eccentric rotational movement about an axis A extending offset from the center of the cam 24 and through the stationary frame member 14. Rotation of the eccentric cam 24 about the axis A causes the arm hanger 16B to be moved slightly forwardly or rearwardly depending upon the direction of rotation of the cam 24 and thereby adjust or change the position of the swing arm 16 laterally or sidewise relative to the stationary frame member 14. A similar hanger on the opposite side of the swing arm 16 is mounted via a pivot bolt to the frame 14 with sufficient play provided between the pivot bolt and arm to accommodate the small amount of sidewise movement of the swing arm 16 relative to the frame 14 as brought about by the rotational adjustment of the eccentric cam 24. Thus, rotation of the eccentric cam 24 is employed to accomplish lateral alignment of the swing arm 16 and the furrow closing wheels 18 thereon over the seed furrow (not shown) formed by the seed planting unit 12 by changing the orientation or position of a pivotal axis P of the swing arm 16 defined by the hanger 16B on the arm 16. The cam rotational axis A is defined by a retaining bolt 26 extending through and rotatably mounting the eccentric cam 24 to the stationary frame member 14. The retaining bolt 26 has a head 28 can be engaged with a suitable tool, such as a socket wrench, to tighten the head 28 against the outer end portion 24A of the eccentric cam 24 and clamp and retain the eccentric cam 24 in a fixed position or to loosen the bolt 26 and permit rotation of the eccentric cam 24.

Accordingly, to adjust the arm 16, the retaining bolt 26 mounting the eccentric cam 24 is thus loosened and the eccentric cam 24 is turned in one direction to swing the arm 16 and thereby move the closing wheels 18 to the right or turned in the opposite direction to swing the arm 16 and thereby move the closing wheels 18 to the left. When the closing wheels 18 are properly aligned with the seed furrow, the retaining bolt 26 is then tightened to prevent further inadvertent rotation of the eccentric cam 24.

The above-described arrangement of components of the seed planting unit 12 are well-known prior art components present in a conventional seed planting implement commercially available from Deere & Company of Moline, Ill. As explained earlier, certain problems have been experienced by the provision of the eccentric cam 24 in the above-described arrangement. Specifically, as the furrow closing wheels 18 travel through the soil of a field, forces are applied to the wheels 18 which are transmitted through the swing arm 16. These forces result in application of a torque on the eccentric cam 24 sufficient to overcome the holding force applied on the eccentric cam 24 by the tightened retaining bolt 26, thereby allowing unintended loosening and rotation of the eccentric cam 24 to occur which results in sidewise movement of the arm 16 and misalignment of the furrow closing wheels.

Referring to FIGS. 1–4, in accordance with the present invention, an eccentric cam locking assembly, generally designated 30, is provided which overcomes the above-identified problems. The eccentric cam locking assembly 30 is mounted on each of the seed planting units 12 of the implement 10 between a portion of the stationary frame member 14, preferably the gauge wheel pivot 22, and the outer end portion 24A of the eccentric cam 24.

The eccentric cam locking assembly 30 basically includes an elongated locking bar 32 having a first end portion 32A and a second end portion 32B opposite from the first end portion 32A, a first fastening arrangement 34 defined on the first end portion 32A of the locking bar 32 for mounting the locking bar 32 on the gauge wheel pivot 22 of the stationary frame member 14 so as to permit longitudinal and pivotal movements of the locking bar 32 relative to the stationary member 14, and a second fastening arrangement 36 defined on the second end portion 32B of the locking bar 32 for clamping the locking bar 32 on the eccentric cam 24 so as to inhibit rotation of the eccentric cam 24 relative to the locking bar 32.

The first fastening arrangement 34 includes an enclosed elongated slot 38 defined through the first end portion 32A of the locking bar 32 and a first fastener 40 extending through the slot 38 and threaded into the gauge wheel pivot 22 so as to mount the first end portion 32A of the locking bar 32 on the gauge wheel pivot 22. Additionally, washer 42, bushing 43 and spacer 44 are utilized when mounting the first end portion 32A of the locking bar 32 to the gauge wheel pivot 18. The first fastener 40 is tightened relative to the gauge wheel pivot 22 so as to mount the locking bar 32 thereon and, due to the presence of the bushing 43, allow longitudinal and pivotal movements of the locking bar 32 relative to the gauge wheel pivot 22 in order to correspondingly permit adjusting of the position of the arm 16.

The second fastening arrangement 36 includes a circular hole 46 and a narrow slot 48 formed at the second opposite end portion 32B of the locking arm 32. The slot 48 extends from a terminal edge 32C of the second end portion 32B to the circular hole 46 so as to form the second end portion 32B of the locking bar 32 with a bifurcated configuration. The circular hole 46 is large enough so that the second end portion 32B may be fitted over the eccentric cam 24. The second fastening arrangement 36 also includes a second fastener 50 extending through a pair of collars 32D attached to the terminal edge 32C of the second end portion 32B of the locking bar 32 so as to bridge a gap G defined across the narrow slot 48. The second fastener 50 is rotatably adjustable between tightened and released conditions relative to the eccentric cam 24 so as to respectively inhibit and allow rotation of the eccentric cam 24 relative to arm 16 in order to correspondingly prevent and permit adjusting of the position of the arm 16 relative to the stationary frame member 14. When the second fastener 50 is tightened, it operates to clamp the locking bar 32 on the eccentric cam 24 thereby preventing rotation of the eccentric cam 24.

The locking assembly 30 also includes an annular sleeve 52 which fits over the eccentric cam 24 and is disposed between the second end portion 32B of the locking bar 32 and the hanger 16B of the swing arm 16. The sleeve 52 keeps the locking bar 32 from sliding too far inward onto the eccentric cam 24 which would allow the fastener 50 to contact the swing arm 16.

The locking assembly 30 further includes an element 54, preferably in the form of a hexagonal nut, defined on and extending outwardly from the outer end portion 24A of the eccentric cam 24 adjacent to the head 28 of the retaining bolt 26. The hexagonal nut 54 is provided to allow engagement by a tool, such as a suitable socket wrench, with the nut 54 to assist in rotating the eccentric cam 24.

The eccentric cam locking assembly 30 is intended to be installed after the furrow closing wheels 14 are aligned, but it is releasable so that after installation the eccentric cam 24 may be turned to adjust the alignment of the furrow closing wheels 18. To adjust the eccentric cam 24, the second fastener 50 is loosened to unclamp the locking bar 32. The first fastener 40 and bushing 43 mount the first end portion 32A on the gauge wheel pivot 18 such that locking bar 32 is preset to move longitudinally and pivot about the first fastener 40 and bushing 43. With the locking bar 32 released, the eccentric cam retaining bolt 26 can be loosened and the eccentric cam 24 turned until the furrow closing wheels 18 are aligned just as before installation of the eccentric cam locking assembly 30. Once the furrow closing wheels 18 are properly aligned and the retaining bolt 26 tightened, the fastener 50 is tightened to clamp the locking bar 32 on the eccentric cam 24 thereby preventing unintended rotation of the eccentric cam 24.

It is thought that the present invention and its advantages will be understood from the foregoing description and it will be apparent that various changes may be made thereto without departing from the spirit and scope of the invention or sacrificing all of its material advantages, the form hereinbefore described being merely preferred or exemplary embodiment thereof.

We claim:

1. An eccentric cam locking assembly for use with a planting apparatus including a stationary member, an eccentric cam rotatably mounted to the stationary member, and a movable member movably mounted to the stationary member and coupled to the eccentric cam and being disposed in a position adjustable relative to the stationary member in response to rotation of the eccentric cam, said eccentric cam locking assembly comprising:

(a) an elongated locking bar having a first end portion and an second end portion opposite said first end portion;

(b) first means defined on said first end portion of said locking bar for mounting said locking bar on the stationary member of the apparatus, said first means being a first fastening arrangement preset relative to the stationary member so as to allow longitudinal and pivotal movements of said locking bar relative to the stationary member in order to correspondingly permit adjusting of the position of the movable member relative to the stationary member; and (c) second means defined on said second end portion of said locking bar for clamping said locking bar on the eccentric cam so as to inhibit rotation of the eccentric cam relative to said locking bar.

2. The assembly of claim 1 wherein said first means for mounting said locking bar on the stationary member is a first fastening arrangement preset relative to the stationary member so as to allow longitudinal and pivotal movements of said locking bar relative to the stationary member in order to correspondingly permit adjusting of the position of the movable member relative to the stationary member.

3. The assembly of claim 2 wherein said first fastening arrangement includes:

means defining an elongated slot in said first end portion of said locking bar; and a fastener and bushing extending through said slot and said fastener extending into the stationary member and being preset relative to the stationary member so as to allow longitudinal and pivotal movements of said locking bar relative to the stationary member.

4. An eccentric cam locking assembly for use with an apparatus including a stationary member, an eccentric cam rotatably mounted to the stationary member, and a movable member movably mounted to the stationary member and coupled to the eccentric cam and being disposed in a position adjustable relative to the stationary member in response to rotation of the eccentric cam, said eccentric cam locking assembly comprising:

(a) an elongated locking bar having a first end portion and an second end portion opposite said first end portion;

(b) first means defined on said first end portion of said locking bar for mounting said locking bar on the stationary member of the apparatus; and (c) second means defined on said second end portion of said locking bar for clamping said locking bar on the eccentric cam so as to inhibit rotation of the eccentric cam relative to said locking bar, said second means being a second fastening arrangement adjustable between tightened and released conditions relative to the eccentric cam so as to respectively inhibit and allow rotation of the eccentric cam relative to the movable member in order to correspondingly prevent and permit adjusting of the position of the movable member relative to the stationary member.

5. The assembly of claim 4 wherein said second fastening arrangment includes:

means defining a hole through said second end portion of said locking bar adapting said locking bar to fit over an outer end portion of the eccentric cam;

means defining a narrow slot through said second end portion of said locking bar extending from a terminal edge of said second end portion to said hole so as to form said second end portion with a bifurcated configuration; and a fastener attached to said terminal edge of said second end portion so as to bridge a gap defined across said narrow slot, said fastener being adjustable between said tightened and released conditions relative to the eccentric cam to clamp and unclamp said second end portion of said locking bar on the outer end portion of the eccentric cam.

6. The assembly of claim 4 further comprising:

(d) an element defined on and extending outwardly from an outer end portion of the eccentric cam to allow engagement of a tool with said element to assist in rotating the eccentric cam.

7. The assembly of claim 4 further comprising:

(d) a sleeve disposed over an outer end portion of the eccentric cam and between said second end portion of said locking bar and the stationary member from which the eccentric cam extends, said sleeve having a length being sufficient to space said second end portion of said locking bar from the stationary member so as to prevent contact therewith.

8. The assembly of claim 7 further comprising:

(e) an element defined on and extending outwardly from an outer end portion of the eccentric cam to allow engagement of a tool with said element to assist in rotating the eccentric cam.

9. The assembly of claim 8 wherein said element is a hexagonal shaped nut attached to the outer end portion of the eccentric cam.

10. In combination with a seed planting implement including a stationary member, an eccentric cam rotatably mounted to said stationary member, a swing arm mounted to said stationary member and coupled to said eccentric cam, and furrow closing wheels mounted on said swing arm, said swing arm being movably mounted to said stationary member and disposed in a position adjustable relative to said stationary member in response to rotation of said eccentric cam to allow for proper alignment of said closing wheels over a seed furrow formed by said seed planting implement, an eccentric cam locking assembly for mounting on said seed planting implement, said eccentric cam locking assembly comprising:

(a) an elongated locking bar having a first end portion and an second end portion opposite said first end portion;

(b) first means defined on said first end portion of said locking bar for mounting said locking bar on said stationary member of said implement so as to inhibit movement of said locking bar relative to said stationary member; and (c) second means defined on said second end portion of said locking bar for clamping said locking bar on said eccentric cam so as to inhibit rotation of said eccentric cam relative to said locking bar.

11. The combination of claim 10 wherein said first means for mounting said locking bar on said stationary member is a first fastening arrangement preset relative to said stationary member so as to allow longitudinal and pivotal movements of said locking bar relative to said stationary member in order to correspondingly permit adjusting of the position of said swing arm relative to said stationary member.

12. The combination of claim 11 wherein said first fastening arrangement includes:

means defining an enclosed elongated slot in said first end portion of said locking bar; and a fastener and bushing extending through said slot and said fastener extending into said stationary member and being preset relative to said stationary member so as to allow longitudinal and pivotal movements of said locking bar relative to said stationary member.

13. The combination of claim 10 wherein said second means for mounting said locking bar on said eccentric cam is a second fastening arrangement adjustable between tightened and released conditions relative to said eccentric cam so as to respectively inhibit and allow rotation of said eccentric cam relative to said swing arm in order to correspondingly prevent and permit adjusting of the position of said swing arm relative to the stationary member.

14. The combination of claim 13 wherein said second fastening arrangment includes:

means defining a hole through said second end portion of said locking arm adapting said locking bar to fit over an outer end portion of said eccentric cam;

means defining a narrow slot through said second end portion of said locking arm extending from a terminal edge of said second end portion to said hole so as to form said second end portion with a bifurcated configuration; and a fastener attached to said terminal edge of said second end portion so as to bridge a gap defined across said narrow slot, said fastener being adjustable between said tightened and released conditions relative to said eccentric cam to clamp and unclamp said second end portion of said locking arm on said outer end portion of said eccentric cam.

15. The combination of claim 10 further comprising:

(d) an element defined on and extending outwardly from an outer end portion of said eccentric cam to allow engagement of a tool with said element to assist in rotating said eccentric cam.

16. The combination of claim 10 further comprising:

(d) a sleeve disposed over an outer end portion of said eccentric cam and between said second end portion of said locking bar and said stationary member from which said eccentric cam extends, said sleeve having a length being sufficient to space said second end portion of said locking bar from said stationary member so as to prevent contact therewith.

17. The combination of claim 16 further comprising:

(e) an element defined on and extending outwardly from an outer end portion of said eccentric cam to allow engagement of a tool with said element to assist in rotating the eccentric cam.

18. The combination of claim 17 wherein said element is a hexagonal shaped nut attached to said outer end portion of said eccentric cam.

19. The combination of claim 10 wherein said seed planting implement also includes a gauge wheel pivot extending outward from said stationary member, said first mounting means defined on said first end portion of said locking bar being mounted on said gauge wheel pivot.

20. The combination of claim 10 wherein said first end portion of said locking bar is offset from said second end portion thereof in a direction transverse to a longitudinal dimension of said locking bar to thereby facilitate mounting said locking bar on said eccentric cam and said gauge wheel pivot.

* * * * *